United States Patent
Hakola et al.

(10) Patent No.: US 9,276,708 B2
(45) Date of Patent: Mar. 1, 2016

(54) SECONDARY SYSTEM USAGE IN MULTICARRIER NETWORKS

(75) Inventors: Sami-Jukka Hakola, Oulu (FI); Timo Kalevi Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1575 days.

(21) Appl. No.: 12/643,201

(22) Filed: Dec. 21, 2009

(65) Prior Publication Data

US 2011/0151887 A1    Jun. 23, 2011

(51) Int. Cl.
| | |
|---|---|
| H04W 72/00 | (2009.01) |
| H04L 5/00 | (2006.01) |
| H04W 72/04 | (2009.01) |
| H04L 27/00 | (2006.01) |
| H04W 72/08 | (2009.01) |
| H04W 76/02 | (2009.01) |

(52) U.S. Cl.
CPC ............ *H04L 5/001* (2013.01); *H04L 27/0006* (2013.01); *H04W 72/0453* (2013.01); *H04L 5/0091* (2013.01); *H04W 72/082* (2013.01); *H04W 76/023* (2013.01)

(58) Field of Classification Search
USPC ................. 455/452, 1, 452.2, 450, 561, 63.2, 455/422.1; 370/315, 329, 328, 227, 282
See application file for complete search history.

(56) References Cited

U.S. PATENT DOCUMENTS

| | | | |
|---|---|---|---|
| 7,013,158 B1 | 3/2006 | Cook | |
| 2007/0133491 A1* | 6/2007 | Ushiki | .................. H04W 88/06 370/338 |
| 2010/0009675 A1* | 1/2010 | Wijting | ................. H04W 72/02 455/426.1 |
| 2010/0069065 A1* | 3/2010 | Sambhwani | ........ H04J 11/0093 455/434 |
| 2011/0134827 A1* | 6/2011 | Hooli et al. | .................... 370/315 |
| 2012/0057490 A1* | 3/2012 | Park | ......................... H04L 5/001 370/252 |

(Continued)

FOREIGN PATENT DOCUMENTS

| | | |
|---|---|---|
| CN | 101176082 A | 5/2008 |
| CN | 101296059 A | 10/2008 |

(Continued)

OTHER PUBLICATIONS

Yan Zhang et al., "Performance Analysis of Intra-cell Spatial Reuse in a P2P-enabled TDD CDMA Network", PUB-IEEE 64th Vehicular Technology Conference, Montreal, Quebec, Canada, 2006, pp. 1-5.

(Continued)

*Primary Examiner* — Suhail Khan
(74) *Attorney, Agent, or Firm* — Squire Patton Boggs (US) LLP (57) ABSTRACT

After an evolved Node-B (eNB) has selected primary component carriers and secondary component carriers, the eNB can transmit (for example, by broadcast), the information for secondary usage (such as certain conditions) to devices. The devices can also be machines or the like that are able to operate on cellular system resources, for example, machine-to-machine type communication in a cellular system. The devices can figure out component carrier utilization in the cells they can detect. Furthermore, the devices can estimate the interference caused by themselves based on the eNB's broadcasting conditions as well as upon additional information, in some circumstances. Finally, the devices can then decide whether to establish device-to-device (D2D) or other secondary communication connection themselves by using the secondary component carriers.

11 Claims, 4 Drawing Sheets

(56) References Cited

U.S. PATENT DOCUMENTS

2012/0076042 A1* 3/2012 Chun .................. H04W 72/042
370/252
2012/0099464 A1* 4/2012 Chun ........................ H04L 5/00
370/252

FOREIGN PATENT DOCUMENTS

| WO | 2006/016330 A1 | 2/2006 |
|---|---|---|
| WO | 2008/034023 A1 | 3/2008 |
| WO | 2010/049801 A1 | 5/2010 |

OTHER PUBLICATIONS

Klaus Doppler et al., "Device-to-Device Communication as an Underlay to LTE-Advanced Networks", PUB_IEEE Communications Magazine, 2009, pp. 42-49.

Klaus Doppler et al., "Device-to-Device Communications; Functional Prospects for LTE-Advanced Networks", PUB-Communications ICC Workshops, 2009, pp. 1-6.

Mohammad Zulhasnine et al., "Efficient Resource Allocation for Device-to-Device Communication Underlaying LTE Network", PUB-Wireless and Mobile Computing, Networking and Communications (WiMob), IEEE 6th International Conference, 2010, pp. 368-375.

International Search Report application No. PCT/IB2010/055356 dated Mar. 18, 2011.

Eiman Mohyeldin, et al., "Common Pilot Method Enabling Network Assisted Fast Scanning for Reconfigurable Terminals," Siemens AG, 4th Karlsruhe Workshop on Software Radios, Karlsruhe, Mar. 2006, pp. 1-5.

Paul Houzé, et al., "Common Pilot Channel for Network Selection," IEEE VTC in Spring Conference, Melbourne, IEEE, May 2006, pp. 67-71.

P. Cordier, et al., "$E^2R$ Cognitive Pilot Channel Concept," IST Summit, Mykonos, Jun. 2006, pp. 1-4.

Jordi Pérez-Romero, et al., "A Novel On-Demand Cognitive Pilot Channel Enabling Dynamic Spectrum Allocation," DySPAN 2007, pp. 1-9.

3GPP TSG RAN WG1 #55 Meeting, R1-084321, Nokia Siemens Networks, Nokia, "Algorithms and Results for Autonomous Component Carrier Selection for LTE-Advanced," Prague, Czech Republic, Nov. 10-14, 2008, pp. 1-5.

3GPP TSG RAN WG1 #55-bis Meeting, R1-090235, Nokia Siemens Networks, Nokia, "Use of Background Interference Matrix for Autonomous Component Carrier Selection for LTE-Advanced,"Ljubljana, Slovenia, Jan. 12-16, 2009, pp. 1-7.

3GPP TSG RAN WG1 #56 Meeting, R1-090735, Nokia Siemens Networks, Nokia, "Primary Component Carrier Selection, Monitoring, and Recovery," Athens, Greece, Feb. 9-13, 2009, pp. 1-6.

3GPP TSG RAN WG1 #58 Meeting, R1-093320, Nokia Siemens Networks, Nokia, Qualcomm Europe, China Unicorn, "Mechanism for Cell Specific Component Carrier Usage," Shenzhen, China, Aug. 24-28, 2009, 1-3.

Chinese Office Action dated Oct. 31, 2014, issued in corresponding Chinese Patent Application No. 201080058444.0, 6 pages.

Chinese Office Action dated Apr. 30, 2014, issued in corresponding Chinese Patent Application No. 201080058444.0, 6 pages.

* cited by examiner

SECONDARY SYSTEM USAGE IN MULTICARRIER NETWORKS

BACKGROUND

1. Field

Secondary system usage in a wireless network may be related to opportunistic usage of radio resources/spectrum of a primary system or cognitive radio operation. The primary system could be, for example, conventional cellular communication, such as, for example, a Long Term Evolution A (LTE-A) network. In other words, a secondary system or secondary users may utilize spectrum of primary system opportunistically, but may be constrained by the secondary system not being permitted to degrade performance or interfere excessively with the primary system.

2. Description of the Related Art

LTE-A describes a multicarrier system in which each cell has a primary component carrier and several secondary component carriers. Each cell in LTE-A may automatically select one of the component carriers as its primary carrier when eNB is powered on. Further, each cell may dynamically select additional component carriers for transmission/reception as well when the traffic load increases, but taking into account the caused interference on neighbor cells before activating new component carriers. The component carrier usage, however, is an open item and may be changed. Thus, this description is simply one example of an LTE-A system.

As a result, there can be a dynamic behavior of activations and de-activations of component carriers by evolved Node-Bs (eNBs) in the LTE-A system. In the LTE-A system the eNBs may control cells. Thus there may be muted (spatially unused spectrum) component carriers in cells that could be utilized for the secondary usage of radio resources, such as for direct device-to-device (D2D) communication or some other local communication scheme (sensor networks, local mobile-to-mobile (M2M) communication, etc.).

SUMMARY

Certain embodiments of the present invention relate to a method that includes selecting at least one primary component carrier for a cell of a radio network. The method also includes selecting at least one secondary component carrier for the cell of the radio network. Initiating transmission of at least one condition to at least one device is also included in the method. The at least one condition is configured to permit the at least one device to determine whether to use at least one of the at least one secondary component carriers for device-to-device communication with at least one other device.

Additional embodiments of the present invention relate to a method including receiving at least one condition from a base station of a cell of a radio network, wherein the at least one condition is relevant to at least one second component carrier for the cell of the radio network. The method also includes estimating interference caused by prospective transmission from a device in a prospective device-to-device communication. The method further includes deciding whether to engage in the prospective device-to-device communication based on comparing a result of the estimating to the at least one condition. Initiating device-to-device communication when a result of the deciding is that the prospective device-to-device communication can be accomplished without violating the at least one condition with respect to interference, is also be included in the method.

Certain embodiments of the present invention are a computer readable-medium encoded with instructions that, when executed in hardware, perform one of the preceding methods.

Various embodiments of the present invention relate to an apparatus that includes at least one memory including computer program code and at least one processor. The at least one memory and the computer program code are configured to, with the at least one processor, cause the apparatus at least to select at least one primary component carrier for a cell of a radio network. The at least one memory and the computer program code are also configured to, with the at least one processor, cause the apparatus at least to select at least one secondary component carrier for the cell of the radio network. The at least one memory and the computer program code are further configured to, with the at least one processor, cause the apparatus at least to initiate transmission of at least one condition to at least one device, wherein the at least one condition is configured to permit the at least one device to determine whether to use at least one of the at least one secondary component carriers for device-to-device communication with at least one other device.

Certain embodiments of the present invention relate to an apparatus that includes at least one memory including computer program code and at least one processor. The at least one memory and the computer program code are configured to, with the at least one processor, cause the apparatus at least to receive at least one condition from a base station of a cell of a radio network. The at least one condition is relevant to at least one second component carrier for the cell of the radio network. The at least one memory and the computer program code are also configured to, with the at least one processor, cause the apparatus at least to estimate interference caused by prospective transmission from a device in a prospective device-to-device communication. The at least one memory and the computer program code are further configured to, with the at least one processor, cause the apparatus at least to decide whether to engage in the prospective device-to-device communication based on comparing a result of the estimating to the at least one condition. The at least one memory and the computer program code are additionally configured to, with the at least one processor, cause the apparatus at least to initiate device-to-device communication when a result of the deciding is that the prospective device-to-device communication can be accomplished without violating the at least one condition with respect to interference.

An apparatus according to another embodiment of the present invention includes primary selecting means for selecting at least one primary component carrier for a cell of a radio network. The apparatus also includes secondary selecting means for selecting at least one secondary component carrier for the cell of the radio network. The apparatus further include initiating means for initiating transmission of at least one condition to at least one device. The at least one condition is configured to permit the at least one device to determine whether to use at least one of the at least one secondary component carriers for device-to-device communication with at least one other device.

A further embodiment of the present invention is also an apparatus. The apparatus includes receiving means for receiving at least one condition from a base station of a cell of a radio network, wherein the at least one condition is relevant to at least one second component carrier for the cell of the radio network. The apparatus also includes estimating means for estimating interference caused by prospective transmission from a device in a prospective device-to-device communication. Decision means for deciding whether to engage in the prospective device-to-device communication based on comparing a result of the estimating to the at least one condition are also included. The apparatus additionally includes initiating means for initiating device-to-device communication when a result of the deciding is that the prospective device-to-device communication can be accomplished without violating the at least one condition with respect to interference.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

In LTE-A, secondary system usage or spectrum sensing cognitive radio can include the idea of a Cognitive Pilot Channel (CPC) that aims to provide a solution to assist the mobile, reconfigurable, and cognitive terminal in procedures like Radio Access Technology (RAT) selection in heterogeneous networks with different access networks available and varying spectrum allocations. The CPC can be a channel that carries the information corresponding to the operators, RATs, and frequencies allocated in a given area, so that cognitive terminals do not require scanning the entire spectrum in order to find out the available systems.

It can be that eNBs not only know the allocation of component carriers in their own respective cells, but also know the allocation of component carriers in neighbor cells. The eNBs may use a radio resource allocation table (RRAT), where the RRAT is a table expressing which component carriers are allocated by the surrounding eNBs. Hence, the RRAT is based on information from the surrounding eNBs. Additionally, downlink reference signal received power (RSRP) measurements performed by user equipment (UEs) may be available at eNBs.

Thus, an LTE-A eNB (which may be one example of a base station) may be able to estimate the unused spatial communication area that can be used for the secondary usage from the RSRP measurements of UEs and knowledge of allocation of component carriers in own and neighbor cells. The usage on the uplink resources can rely on estimation of interference impact at the receiver of eNBs and the usage on downlink resources can rely on estimation of interference impact at the receiver of cellular UEs.

In certain embodiments of the present invention, after the eNB has selected the primary component carriers and the secondary component carriers, the eNB can broadcast the information for secondary usage (such as certain conditions) and devices can estimate the interference caused by themselves based on the eNB's broadcasting conditions, and then decide whether to establish device-to-device (D2D) connection themselves by using the secondary component carriers.

In view of certain embodiments of the present invention, there may be at least three options for uplink interference estimation, as the UE may be able to estimate its possible uplink interference caused to the network based on its transmission power and path loss. Additionally, in view of certain embodiments of the present invention, the UE may have an option for downlink interference estimation. It should be noted that the conditions for uplink and downlink might be different, since traffic in the system and the radio characteristics of the devices and eNBs may be asymmetrical.

Accordingly, in certain embodiments the eNB can generate the conditions that need to be fulfilled by the devices (or machines) in order to be able to use LTE-A resources for the secondary system. These devices or machines may be LTE/LTE-A capable. The conditions may be broadcasted or signaled via dedicated signaling (for example, if the eNB sets up a D2D connection between two devices). There may also or alternatively be certain means for devices to be able to estimate by themselves whether they could be able to use some certain radio resources on some certain location for the secondary usage.

The eNB can be configured at least to indicate that secondary usage is allowed, and upon which conditions secondary usage is allowed. Conditions could include, for examples, a list of cells to which the conditions shall be checked or some rules according to which the UE selects cells to be evaluated.

When an eNB is going to activate a new component carrier, which it earlier allowed for the secondary usage, it may cancel the secondary usage permission on that carrier, assuming it was allowed earlier (if it was not allowed early, non such cancellation may be necessary). Similarly, when an adjacent eNB activates one of the carriers that were previously unoccupied (and thus might have been in secondary usage) an own eNB (that is, an eNB for which the adjacent eNB is adjacent) can broadcast and/or utilize dedicated signaling to inform devices and/or machines within its range about the changed conditions in neighbor cells. This approach assumes that eNBs exchange their carrier allocation info or that somehow an eNB is aware of its neighbor eNB's activities. Alternatively, secondary devices, while communicating, may be periodically estimating what carriers are used in the cells they can hear.

When devices become aware of the new conditions due to changes in the carrier activation, they may evaluate the conditions again in order to check whether they can continue secondary system usage. Thus, in certain embodiments, the devices can seek a different component carrier, rather than continuing on a component carrier that is no longer permitted.

The eNBs may not be aware of the secondary usage of different carriers in their own respective cells and/or in adjacent cells. Instead, the eNBs may only signal primary usage. Devices (other than eNBs) may monitor the primary usage of different carriers in their own cell and adjacent cells or follow the carrier utilization by reading system information from the cell they are attached. The concept of an own cell for devices may be selected as the cell with, for example, the strongest signal, since the devices may not be controlling a particular cell, like an eNB may.

Two sets of operations will be discussed. The first set of operations involve the eNB, whereas the second set of operations are operations that can be performed by, for example, a UE, without direct eNB involvement.

Operations for certain embodiments can include:

1. The eNB allows some component carrier for secondary carrier based, for example, on estimations performed by the eNB itself.

2. The eNB broadcasts info about allowance for secondary usage on certain carrier and certain conditions.

3. D2D devices may then evaluate and estimate themselves caused interference to cellular, and may use different formulas for uplink and downlink estimation and evaluation.

Among these, the following operations can be done without direct eNB involvement:

1. Secondary usage devices read info about existing component carriers in the system where devices (including primary and secondary usage devices) are operating to get knowledge of the spectrum used by the system.
2. Secondary usage devices try to find primary carriers of cells they can hear.
3. Secondary system devices try to find occupied secondary component carriers in the cells they can hear.
4. Secondary system devices may now generate the RRAT table using which they can estimate whether secondary system usage could be established or not.
4.1. Secondary system devices may optionally exchange their own observations with one another to obtain a consensus among secondary system devices about a RRAT.
5. Ad hoc devices/D2D devices may autonomously try to establish connection if they both (i.e. both devices in the connection) estimate the their communication would not interfere primary system more than an allowed interference threshold or both devices could estimate maximum allowed power to keep interference to primary system below some commonly agreed threshold. If the allowed power is higher than some reasonable threshold for secondary devices they could establish secondary communication.

The above examples of operations serve to illustrate to ways in which secondary system devices could identify and use radio resources, and in particular examples, unused component carriers. However, in doing so, it may be valuable to keep certain technical considerations in mind.

For example, if in a certain cell/eNB there is an occupied/muted component carrier, that carrier could be utilized for the secondary system as long as the carrier is not activated in the cell and interference impact onto neighbor cells where the carrier in question is active is not too high. These criteria may help to prevent the secondary usage from interfering with the primary usage.

Uplink Examples:

If uplink resources of the cellular system are utilized for the secondary system usage the devices about to have secondary system communication could do the following estimation, which is an example:

Received interference power (long term) in the cell i on carrier c can be calculated as follows if one knows the transmission power of device of secondary usage $P_{tx}$, long term attenuation (shadowed path loss) $\alpha_{i,c}$ and knowledge of whether carrier c is in use in cell i, $RRAT_{i,c}$, as follows:

$$I_{i,c} = P_{tx} \alpha_{i,c} RRAT_{i,c} \leq I_{sec} \qquad (1)$$

If $P_{tx}$ is fixed, the maximum allowed $\alpha_{i,c}$ can be found so that no more interference is cause than is allowed $I_{sec}$. $\alpha_{i,c}$ may be calculated when $RRAT_{i,c}=1$. If the eNB decides to allow a certain carrier to be used for secondary usage it can broadcast the maximum allowed power level for the secondary system usage $P_{tx}$ (for example, maximum allowed power spectral density (psd)) and maximum allowed $\alpha_{i,c}$ (or minimum required path losses) to certain cells.

The eNB may also broadcast a cell list to which conditions have to be checked. As LTE/LTE-A capable users follow the broadcast information on primary carrier they can identify the conditions that need to be fulfilled in order to be able to use certain carrier as secondary system use. The devices may also, during the secondary system use, follow the primary carrier broadcast information about changes in conditions and possible cancellation of secondary usage on certain carrier. In this option the eNB may broadcast a condition for each cell on each carrier.

Another option is to estimate the maximum allowed power by solving $P_{tx}$ from equation (1). If the maximum allowed $P_{tx}$ is greater than some generally agreed threshold level, the secondary system usage may take place.

Another option is to rely on a device that can itself detect $RRAT_{i,c}$, i.e. can determine whether there are carriers active or not in own and neighbor cells (cells in the broadcasted cell list to take into account in condition checking). Then eNBs may be able to broadcast only info about whether secondary usage is allowed or not on certain carrier, and $P_{tx}$ and $I_{sec}$.

Also it could be possible just to signal $I_{sec}$ in addition to permission for secondary usage on a certain carrier. Then devices could then utilize secondary usage as long as product $P_{tx}\alpha_{i,c}$ fulfills (1) to on carrier c to cell i.

Or, another option is to signal interference levels on neighbor cells where carrier is active and a threshold as to how much more interference, $\Delta I_{sec}$, can be allowed from the secondary system upon current interference level.

Downlink Examples:

In the case of downlink for the secondary system usage, now the secondary usage may potentially interfere cellular users of the primary system, that is to say the interference may occur at the devices' receivers. The term i may be defined to be an index of the own cell and j may be defined to be an index of the neighbor cell. Then, a condition on the carrier c that is allowed for the secondary usage and for the own cell i and neighbor cell j on which $RRAT_{j,c}=1$ and j has been included in broadcasted cell list to which condition shall be checked that needs to be fulfilled may be described as follows:

$$\frac{\alpha_{i,c}}{\alpha_{j,c}} \geq \beta \qquad (2)$$

The purpose of imposing such a condition may be to protect active users in neighbor cells where the carrier in question is active. The eNB may broadcast the β in addition to the maximum allowed transmit power, to permit the devices to perform the necessary calculation.

The device in the LTE-A network can in both cases (uplink or downlink), using RSRP measurements (can be transformed to shadowed path loss), check whether the device itself could utilize system in secondary system mode or not. The above calculations are provided examples. Other conditions and other ways of calculating compliance with the conditions are permitted.

Figure 1:
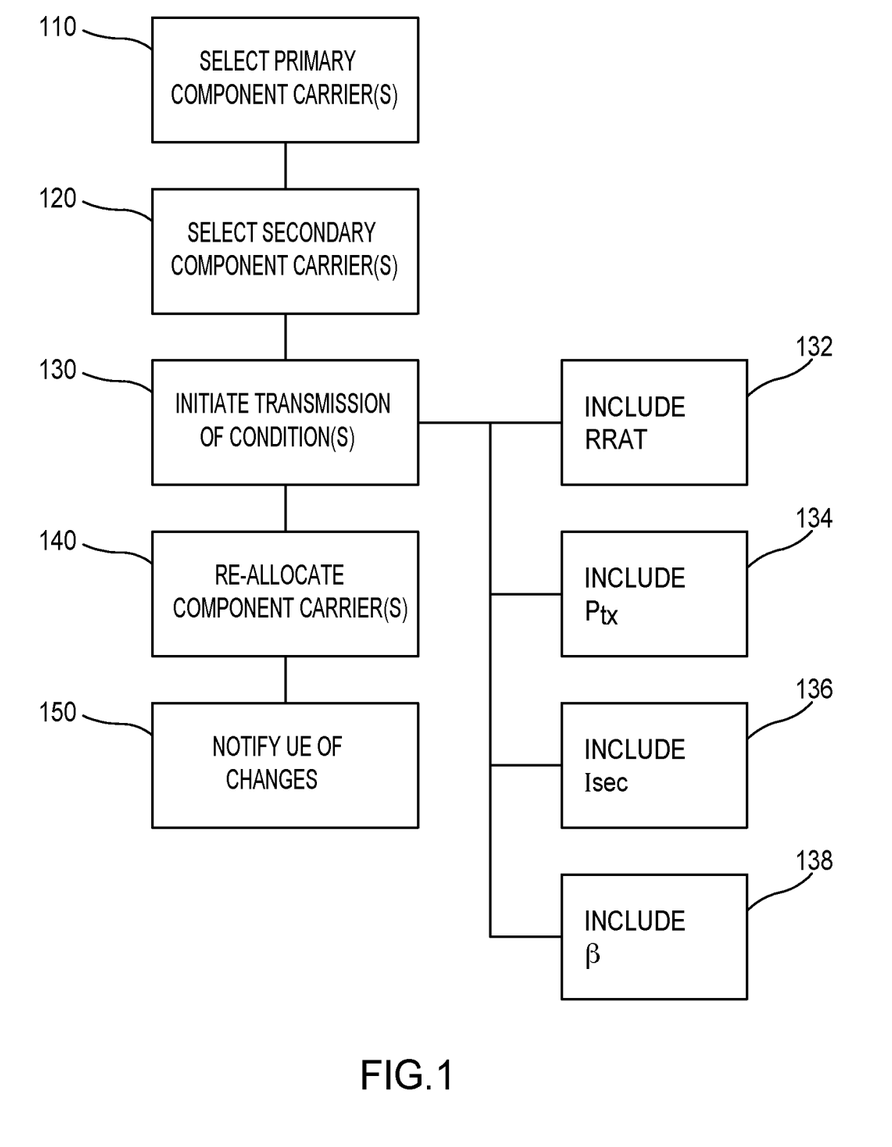
FIG. 1 illustrates a method according to certain embodiments of the present invention.

FIG. 1 illustrate a method according to certain embodiments of the present invention. As shown in FIG. 1, a method can include selecting 110 at least one primary component carrier for a cell of a radio network. The method can also include selecting 120 at least one secondary component carrier for the cell of the radio network. The method can further include initiating transmission 130 of at least one condition to at least one device. The transmission can be sent in a broadcast message. The at least one condition can be configured to permit the at least one device to determine whether to use at least one of the at least one secondary component carriers for device-to-device communication with at least one other device. In other words, the condition can permit the device, which may be a user equipment or a mobile telephone, to determine whether to use one or more of the secondary component carriers for device-to-device communication with another device. The method may be performed by a base station such as an eNB.

The method can also involve including 132 with the condition for transmission a radio resource allocation table. The radio resource allocation table does not have to be created on the network side, however. Instead, in certain embodiments, the radio resource allocation table may be formed by a device, such as a UE either acting alone or in cooperation with other such devices. Additionally, the method involve including 134 with the condition for transmission an indication of maximum allowed transmission power. Furthermore, the method can involve including 136 with the condition for transmission an indication of maximum allowed interference. Moreover, the method can involve including 138 with the condition for transmission an indication of minimum ratio of own long term attenuation to neighbor long term attenuation.

The method can additionally include reallocating 140 the component carriers. This reallocating 140 can include changing a previously secondary component carrier to be a primary component carrier, or releasing a primary component carrier to secondary status. The method can further include initiating notification 150 of the device, such as a UE, of the changes to component carrier status.

Figure 2:
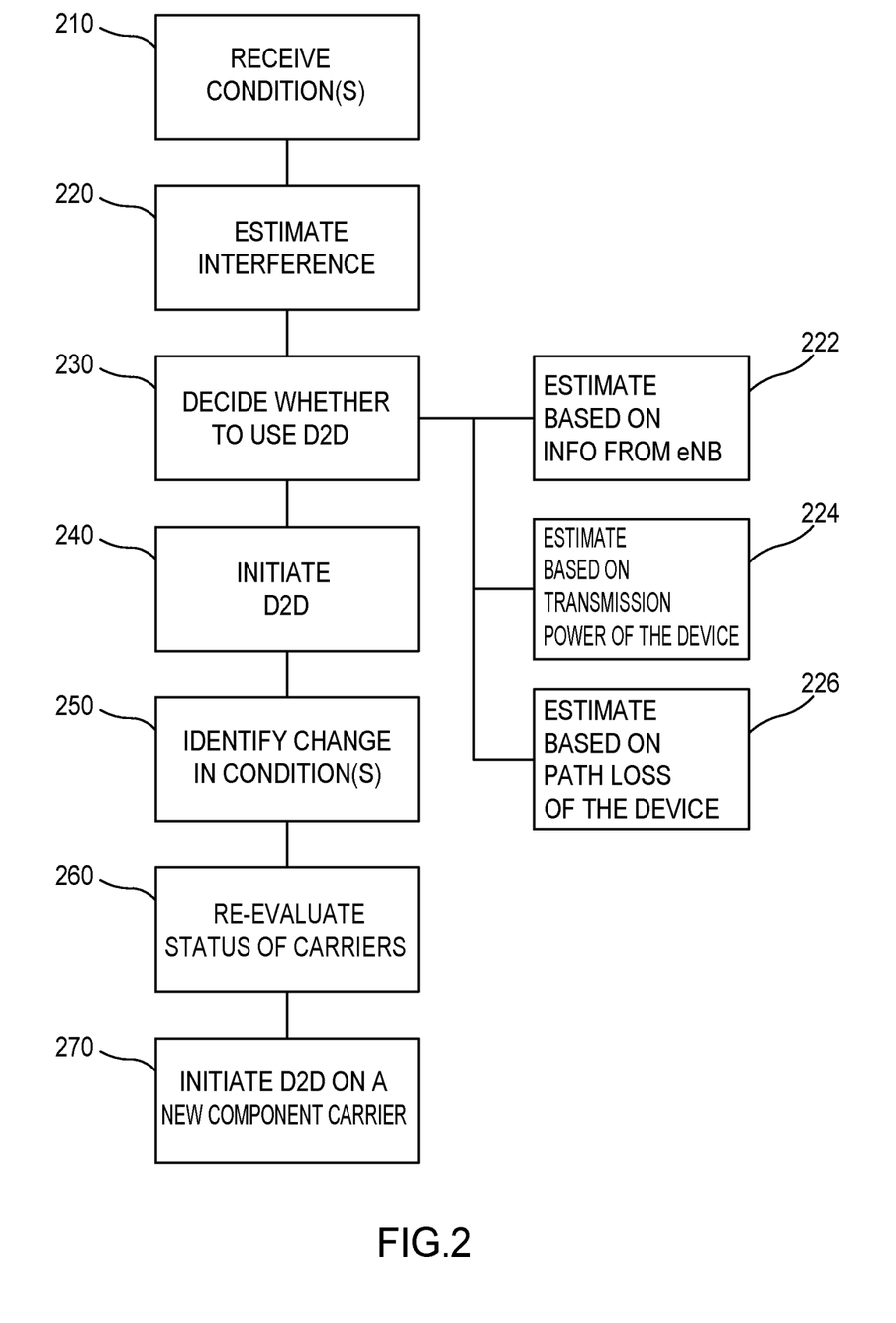
FIG. 2 illustrates a method according to certain embodiments of the present invention.

FIG. 2 illustrates a method according to certain embodiments of the present invention. The method can include receiving 210 at least one condition from a base station, such as an eNB, of a cell of a radio network. The at least one condition may be relevant to at least one second component carrier for the cell of the radio network. The method can also include estimating 220 interference caused by prospective transmission from a device in a prospective device-to-device communication. The method can further include deciding 230 whether to engage in the prospective device-to-device communication based on comparing a result of the estimating to the at least one condition. The method can additionally include initiating device-to-device communication 240 when a result of the deciding is that the prospective device-to-device communication can be accomplished without violating the at least one condition with respect to interference. In other words, if a device-to-device communication would not violate any of the conditions in view of the estimated inference, device-to-device communication be initiated. The method can be performed by a device such as user equipment, sensor, or mobile telephone. Other devices are not excluded.

The method can include estimating 222 the interference based on information received from the base station. The method can also include estimating 224 the interference based on transmission power of the device. The method can further include estimating 226 the interferences based on path loss of the device. The various approaches to estimating (222, 224, and 226) can be performed congruently or separately, as there is no restriction on how many such bases for estimating are used. Additional ways of estimating are also permitted. The method can additionally include identifying 250 that at least one of the at least one conditions has changed, reevaluating 260 whether device-to-device communication is permitted in view of changes to the at least one of the at least one conditions, and initiating 270 device-to-device communication on a new component carrier when a result of the reevaluating indicates that device-to-device communication is only permitted on a different component carrier than a current component carrier. The identifying 250 can be based on receiving a report from the base station, or it can be based on observations by the device of its own radio environment. The method can also include cooperating with at least one peer device to prepare a radio resource allocation table.

The methods described in FIGS. 1 and 2 may be performed in a variety of was. In certain embodiments, a computer-readable medium is encoded with a computer program that is configured to, when executed on hardware, perform the methods. The computer-readable medium may be any tangible medium, and can be, in certain embodiments, a non-transitory medium. For example, a computer-readable medium can be a memory chip, hard drive, or any other suitable storage device. The hardware on which the program is executed may be any suitable particular device. For example, the hardware can be the processor of a UE or eNB, in certain embodiments.

Figure 3:
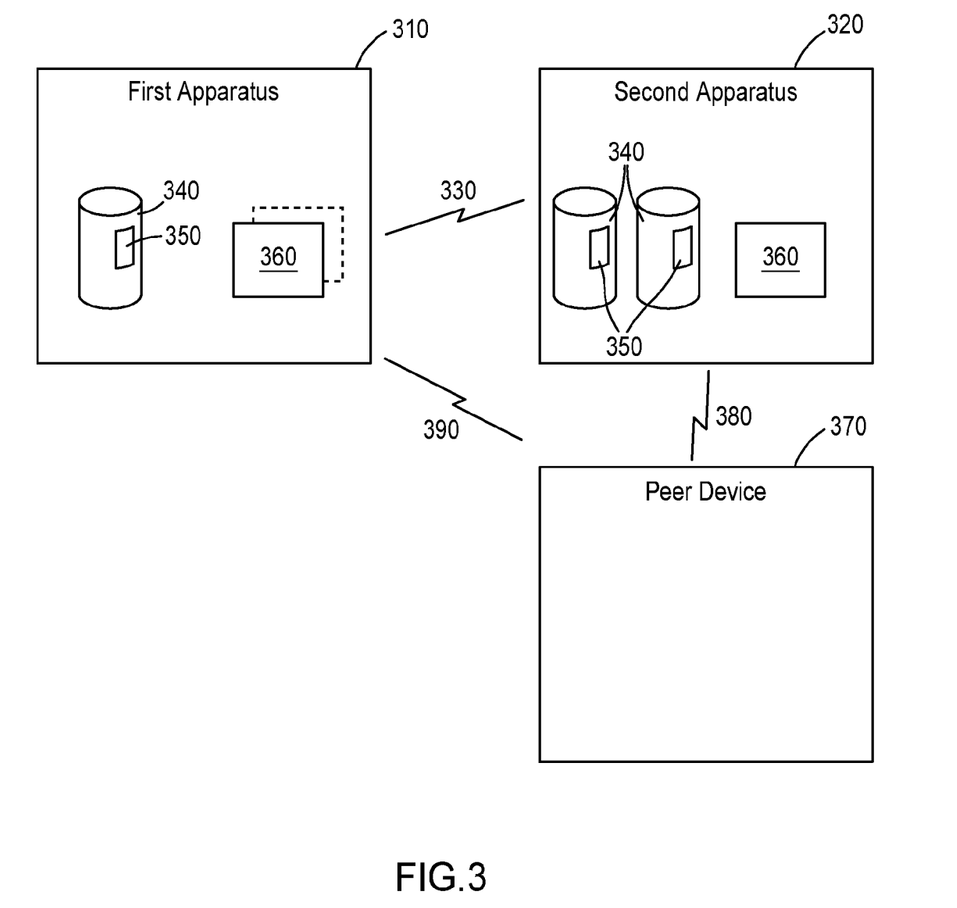
FIG. 3 illustrates a system according to certain embodiments of the present invention.

FIG. 3 illustrates a system according to the present invention. The system of FIG. 3 includes a first apparatus 310 and a second apparatus 320. The first apparatus 310 can be a base station such as an eNB, and the second apparatus 320 can be a device such as, for example, a UE, sensor, or mobile telephone. The first apparatus 310 and the second apparatus 320 are operably connected for communication over a wireless radio link 330 in this example. The first apparatus 310 and the second apparatus 320, each include at least one memory 340 including computer program code 350. The first apparatus 310 and the second apparatus 320, also each include at least one processor 360. The at least one memory 340 and the computer program code 350 can be configured to, with the at least one processor 360, cause the apparatus to perform various processes. For example, they can be configured to cause the first apparatus 310 to perform the method illustrated in FIG. 1 and the second apparatus 320 to perform the method illustrated in FIG. 2.

The memory 340 can be any suitable hardware memory, such as Random Access Memory (RAM). The computer program code 350 can take a variety of forms, from assembled code, if desired, to code written in an interpreted language. The computer program code 350 may be drafted based on embodiments such as those illustrated in FIGS. 1 and 2. The processor 360 can be, for example, a general purpose computer, central processing unit (CPU), or application specific integrated circuit (ASIC).

Certain embodiments of the system of FIG. 3 can also include a peer device 370, which may similar to the second apparatus 320, as to its construction and peer device 370 can be a device such as, for example, a UE, sensor, or mobile telephone. The peer device 370 may be able to communicate directly with the second apparatus 320 by a direct radio link 380 or by an indirect radio link 390, via the first apparatus 310. The peer device 370 can be configured to perform device-to-device communication with the second apparatus 320.

Figure 4:
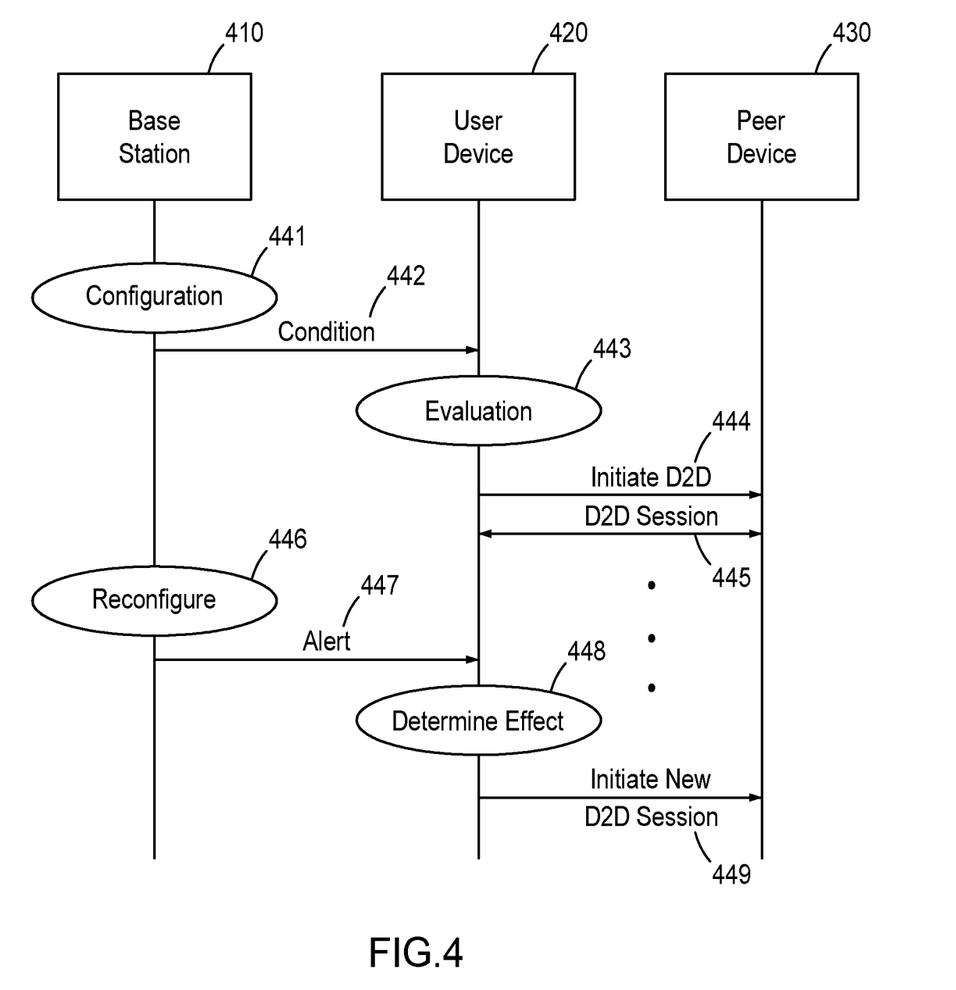
FIG. 4 illustrates a signaling flow diagram illustrating various embodiments of the present invention.

FIG. 4 illustrates a signaling flow diagram illustrating various embodiments of the present invention. As shown in FIG. 4, signaling may be exchanged among a base station 410, a user device 420, and a peer device 430.

Prior to the start of signaling, the base station 410 may engage in configuration 441 of the carrier components under its control. Thus, for example, the base station can designate one or more component carriers as primary, and other component carriers as secondary. The base station 410 then communicates, in this example, information about the secondary component carriers to the user device 420, including one more condition 442 for device-to-device usage of the secondary resources. The condition 442 may be signaled on, for example, a CPC.

The user device 420 can receive the communication that includes the condition 442, and can perform an evaluation 443. In this example, the evaluation 443 can take into account various factors, including information from the base station 410, but also measurements performed by the user device 420 itself.

If the evaluation 443 reveals that device-to-device communication is permitted on at least one secondary component carrier, the user device 420 initiates device-to-device communication 444 with a peer device 430, in this example, without communicating first with the base station 420. Subsequently, the user device 420 can participate in a D2D session 445 with the peer device 430.

While the D2D Session 445 is on-going, the base station 410 can decide to reconfigure 446 the component carriers. One reason that the base station 410 might reconfigure 446 the component carriers would be if a new telephone call were started by a device connected to the base station 410.

The base station 410 can send an alert 447 to the user device 420 alerting the user device 420 that the status of the component carriers has changed. It is possible that this change will have no effect on the D2D session 445, if (for example) the D2D session 445 is using a component carrier that is not affected by the change.

If the change is determined to affect the D2D session 445, however, the user device 420 can initiate a new D2D session 449 on a different component carrier or carriers. Thus, the user device 420 and peer device 430 can continue to communicate directly, despite the change. In certain embodiments there may be more than one peer device 430, and in such cases the user device 420 may initiate new sessions 449 only with those peer devices that are affected by the changes identified in the alert 447.

Certain embodiments of the present invention may be able to extend machine-to-machine communication to address the situation where a device connected to the LTE cellular network may act as a router for many machines using LTE radio but not connected to the network directly. Thus router mobile device (there is no requirement that the device be mobile) may estimate whether secondary system usage is allowed in a certain area and use these allowed resources to communicate with machines not connected directly to the cellular network. Machines may also communicate with each other and this way an LTE device (router for machines to connect the internet) could assign machines some ad hoc resources (secondary usage resources).

Certain embodiments of the present invention may allow secondary system usage in LTE-A networks. These embodiments may be able to be built using available device measurements (that is to say, device measurements that the system would perform for another reason) and inter-eNB communication. The devices being discussed here, may be, for example, a user equipment (UE).

Certain embodiments of the present invention may be an asset for LTE chips that could then be utilized in a wide variety of devices and provide the possibility of ad hoc type communication using LTE resources, while still having the possibility being connected to the network via the same radio interface.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. For example, although the embodiments have been discussed with reference to LTE-A, implementation in other systems is also permitted. In order to determine the metes and bounds of the invention, therefore, reference should be made to the appended claims.

We claim:

1. A method, comprising:
   receiving at least one condition from a base station of a cell of a radio network, wherein the at least one condition is relevant to at least one second component carrier for the cell of the radio network;
   estimating interference caused by prospective transmission from a device in a prospective device-to-device communication;
   deciding whether to engage in the prospective device-to-device communication based on comparing a result of the estimating to the at least one condition; and
   initiating device-to-device communication when a result of the deciding is that the prospective device-to-device communication can be accomplished without violating the at least one condition with respect to interference.

2. The method of claim 1, further comprising:
   estimating the interference based on at least one of information received from the base station, transmission power of the device, or path loss of the device.

3. The method of claim 1, further comprising:
   cooperating with at least one peer device to prepare a radio resource allocation table.

4. The method of claim 1, wherein the method is performed by a user equipment.

5. The method of claim 1, further comprising:
   identifying that at least one of the at least one conditions has changed;
   reevaluating whether device-to-device communication is permitted in view of changes to the at least one of the at least one conditions; and
   initiating device-to-device communication on a new component carrier when a result of the reevaluating indicates that device-to-device communication is only permitted on a different component carrier than a current component carrier.

6. An apparatus, comprising:
   at least one memory including computer program code; and
   at least one processor,
   wherein the at least one memory and the computer program code are configured to, with the at least one processor, cause the apparatus at least to
   receive at least one condition from a base station of a cell of a radio network, wherein the at least one condition is relevant to at least one second component carrier for the cell of the radio network;
   estimate interference caused by prospective transmission from a device in a prospective device-to-device communication;
   decide whether to engage in the prospective device-to-device communication based on comparing a result of the estimating to the at least one condition; and
   initiate device-to-device communication when a result of the deciding is that the prospective device-to-device communication can be accomplished without violating the at least one condition with respect to interference.

7. The apparatus of claim 6, wherein the at least one memory and the computer program code are also configured to, with the at least one processor, cause the apparatus at least to estimate the interference based on at least one of information received from the base station, transmission power of the device, or path loss of the device.

8. The apparatus of claim 6, wherein the at least one memory and the computer program code are also configured to, with the at least one processor, cause the apparatus at least to cooperate with at least one peer device to prepare a radio resource allocation table.

9. The apparatus of claim 6, wherein the apparatus comprises a user equipment.

10. The apparatus of claim 6, wherein the at least one memory and the computer program code are also configured to, with the at least one processor, cause the apparatus at least to
- identify that at least one of the at least one conditions has changed;
- reevaluate whether device-to-device communication is permitted in view of changes to the at least one of the at least one conditions; and
- initiate device-to-device communication on a new component carrier when a result of reevaluation indicates that device-to-device communication is only permitted on a different component carrier than a current component carrier.

11. A non-transitory computer-readable storage medium encoded with instructions that, when executed in hardware, perform a process, the process comprising:
- receiving at least one condition from a base station of a cell of a radio network, wherein the at least one condition is relevant to at least one second component carrier for the cell of the radio network;
- estimating interference caused by prospective transmission from a device in a prospective device-to-device communication;
- deciding whether to engage in the prospective device-to-device communication based on comparing a result of the estimating to the at least one condition; and
- initiating device-to-device communication when a result of the deciding is that the prospective device-to-device communication can be accomplished without violating the at least one condition with respect to interference.

* * * * *